3,300,469
L-LYSYL-L-PHENYLALANYL-L-ISOLEUCYL-GLYCYL-L-LEUCYL-L-METHIONINAMIDE, DERIVATIVES THEREOF AND INTERMEDIATES IN THE PREPARATION THEREOF

Luigi Bernardi and Roberto de Castiglione, Milan, Italy, assignors to Società Farmaceutici Italia, Milan, Italy, a corporation of Italy
No Drawing. Filed May 15, 1964, Ser. No. 367,875
Claims priority, application Italy, May 17, 1963, 10,265/63
6 Claims. (Cl. 260—112.5)

Our invention relates to a new hexapeptide therapeutically useful as a hypotensive, to its protected derivatives and salts, and to a process of preparing them and certain intermediates. The new hexapeptide of the invention is L-lysyl-L-phenylalanyl-L-isoleucyl-glycyl-L-leucyl-L-methioninamide. Its protected derivatives have the two amino groups of the lysyl radical blocked by a protecting group, capable of being removed by acidolysis or hydrogenolysis. Its useful salts are non-toxic pharmaceutically acceptable acid addition salts. The intermediates are L-leucyl-L-methioninamide and L-lysyl-L-phenylalanyl-L-isoleucyl-glycine.

The process of the invention is based on the condensation of the new dipeptide L-leucyl-L-methioninamide with the new tetrapeptide acid, wherein the two amino groups of the lysyl radical are blocked by protective groups capable of being removed by acidolysis or hydrogenolysis. The condensation is carried out in the presence of a carbodiimide condensing agent to yield the hexapeptide of the invention with the two amino groups of the lysyl radical protected. The protected hexapeptide may have the two protecting groups eliminated and be obtained as a salt with an organic or inorganic acid, from which the free hexapeptide itself may be obtained.

Typical examples of non-toxic pharmaceutically acceptable salts are the hydrochloride, sulfate, acetate, trifluoroacetate, gluconate, tartrate, maleate, maleinate, citrate, methanesulfonate, and pamoate, etc.

For protecting the two amino groups of the lysyl radical, the trityl (triphenylmethyl), tosyl (p. toluene-sulfonyl), phthalyl, carbobenzoxy (carbobenzyloxy), carbo-t. butoxy, trifluoroacetyl, formyl and other groups usually employed in polypeptide chemistry may be used.

The condensation between the free amino group of the dipeptide L-leucyl-L-methioninamide and the free carboxyl group of the acid tetrapeptide L-lysyl-L-phenylalanyl-L-isoleucyl-glycine may be accomplished according to the usual methods of polypeptide chemistry, preferably by direct condensation between the free amino group and the free carboxyl group in the presence of dicyclohexyl-carbodiimide, 1-cyclohexyl-3-morpholinyl-ethylcarbodiimide or others known from the literature. The condensation reaction should be carried out in a N,N-dialkyl-formamide or lower aliphatic nitrile solvent, preferably dimethyl-formamide or acetonitrile. The reaction starts in the cold between $-10°$ and $-5°$ C. and is preferably completed at up to $20°$ C. or room temperature in from 3 to 60 hours.

From the protected hexapeptide, on elimination of the protecting groups, the hexapeptide is obtained either free or in the form of a salt with an organic or inorganic acid according to the splitting-off agent used for removing the protecting groups. The choice of the agent employed for removing the protecting groups depends on the nature of the protecting group and may be sodium in liquid ammonia, hydrogen in the presence of palladium, anhydrous hydrogen halides in glacial acetic acid or trifluoroacetic acid. The free hexapeptide may be also obtained by displacement from the corresponding salts with a base or by passing through an ion exchange resin in a column. The final purification of the hexapeptide may be carried out by chromatography, for example on alumina, cellulose or an ion exchange resin or by countercurrent distribution.

The starting dipeptide L-leucyl-L-methioninamide is prepared as follows: L-leucine, having the amino group blocked by a protecting group such as carbo-t. butoxy, is condensed with L-methioninamide in the presence of dicyclohexylcarbodiimide as a condensing agent or through the intermediate formation of a mixed leucine-carbonic anhydride to yield the protected dipeptide L-leucyl-L-methioninamide, for example N-carbo-t. butoxy-L-leucyl-L-methioninamide, whose N-carbo-t. butoxy group may then be separated by treatment with an anhydrous hydrogen halide in glacial acetic acid to yield the dipeptide L-leucyl-L-methioninamide as a salt.

The starting acid tetrapeptide L-lysyl-L-phenylalanyl-L-isoleucyl-glycine is prepared as follows: A lower aliphatic ester of glycine, such as ethyl glycinate, is condensed with isoleucine, whose amino group is blocked by a protecting group, such as carbobenzoxy in the presence of dicyclohexylcarbodiimide as a condensing agent to yield the protected dipeptide L-isoleucyl-glycine, for example N-carbobenzoxy-L-isoleucyl-glycine ethylester, whose N-carbobenzoxy group is then split off by treatment with an anhydrous hydrogen halide in glacial acetic acid to obtain the lower aliphatic ester of the acid dipeptide L-isoleucyl-glycine as a salt. From this, by condensation with a derivative of phenylalanine, for example N-carbobenzoxy-L-phenylalanine-p. nitrophenylester, the protected tripeptide N-carbo-benzoxy-L-phenylalanyl-L-isoleucyl-glycine ethyl ester is obtained, whose N-carbobenzoxy group may then be split off on treatment with an anhydrous hydrogen halide in glacial acetic acid to obtain the lower aliphatic ester of the acid tripeptide L-phenylalanyl-L-isoleucyl-glycine as a salt. From this, by condensation with a protected derivative of lysine-p. nitrophenyl ester having the two amino groups blocked by protecting groups capable of being removed by acidolysis or hydrogenolysis, such as $N^\alpha,N^\epsilon$-di-carbo-t. butoxy-L-Lysine-p. nitrophenyl ester, the protected tetrapeptide $N^\alpha,N^\epsilon$-di-carbo-t. butoxy - L - lysyl-L-phenylalanyl-L-isoleucyl-glycine ethyl ester may be obtained. The ester group may then be selectively saponified with an alkaline hydrolyzing agent, such as dilute sodium or potassium hydroxide to yield the acid tetrapeptide $N^\alpha,N^\epsilon$-di-carbo-t. butoxy-L-lysyl-L-phenylalanyl-L-isoleucyl-glycine.

The hexapeptides of the invention have a high peripheral vasodilatory activity and so may be employed in the normal therapy of hypertension or in the emergency therapy of hypertensive attacks, in vascular spastic syndromes, especially in muscle-cutaneous sections (Burger's disease, Raynaud's disease, thromboangioitis obliterans, torpid ulcers), of the retinal vessels (amaurosis from spasm of the retina central action), of meningeal vessels (cephalea and hemicrania from vasospasm) and of the coronary vessels (angina attacks). They may be administered in compositions with pharmaceutically acceptable vehicles by the parenteral route: subcutaneously, intramuscularly, intravenously (a single injection or slow dripping) or intra-arterially. The most suitable solvents are water or physiological saline but not alkaline solutions. When using the subcutaneous or intramuscular route, substances retarding absorption may be added to the compound. The percentage of active ingredient may vary according to the particular pharmaceutical form and according to the desired hypotensive effect, but is generally very low. The hexapeptides of the invention do not cause any symptoms of acute or chronic toxicity.

The following examples illustrate the invention. The chromatographic analysis data reported were obtained by an ascending technique on Whatman paper 1 with an n-butanol/acetic acid/water (4:1:1) solvent system, and are expressed as $Rf$. The electrophoretic migration coefficients are also reported in a known symbolism, in which for example $E_{1.9}=0.905$ Leu means that at pH 1.9 the polypeptide tested migrates with a velocity 0.905 times that of leucine.

EXAMPLE 1

*L-leucyl-L-methioninamide*

5.78 g. of N-carbo-t. butoxy-L-leucine (prepared according to George W. Anderson et al., J. Amer. Chem. Soc., 1957, 79, page 6180) were dissolved in 250 cc. of anhydrous tetrahydrofuran and 5.94 cc. tributylamine, 2.4 cc. of ethyl-chloroformate and then a solution of 3.70 g. of L-methioninamide in 25 cc. of anhydrous tetrahydrofuran previously cooled to 0° C. were dropped under stirring into the above solution cooled to $-10°$ C. (L-methioninamide is prepared as described in Example 31 of U.S. application Serial No. 227,564 (F-23084).) Stirring was carried on for a further 2 hours at $-10°$ C. The reaction mixture was then allowed to stand for 2 days at room temperature. The solvent was removed by evaporation under reduced pressure and the residue was dissolved in ethyl acetate. The solution was afterwards sequentially washed with a saturated aqueous sodium chloride solution, 1 N hydrochloric acid solution at 0° C., a 5% aqueous sodium bicarbonate solution and finally with saturated sodium chloride solution to neutrality. The solution was dried over anhydrous sodium sulfate and the solvent was evaporated under reduced pressure. The residue was crystallized from methanol. 6.4 g. of product melting at 158–159° C. were obtained. $[\alpha]_D^{21}=-41.8°$ (c.=2 in methanol). $Rf=0.9$.

Analogous results were achieved, if instead of N-carbot. butoxy-L-leucine another protected derivative of L-leucine was employed.

0.36 g. of N-carbo-t. butoxy-L-leucyl-L-methioninamide prepared as just described was reacted for 30 minutes at room temperature with 2 cc. of an anhydrous 1.3 N hydrogen chloride solution in glacial acetic acid. On the addition of anhydrous diethyl ether, the hydrochloride precipitates, which was then filtered, washed thoroughly with anhydrous diethyl ether and dried in vacuo over potassium hydroxide. 0.290 g. of L-leucyl-L-methioninamide hydrochloride was obtained, melting at 84–94° C. $Rf=0.6$, $E_{1.9}=0.73$ Leu.

By submitting N-carbo-t. butoxy-L-leucyl-L-methioninamide to acidolysis with hydrogen bromide in glacial acetic acid, L-leucyl-L-methioninamide was obtained as the hydrobromide.

EXAMPLE 2

*$N^\alpha,N^\epsilon$-di-carbo-t. butoxy-L-lysyl-L-phenylalanyl-L-isoleucyl-glycine*

To a suspension of 8.40 g. of glycine ethyl ester hydrochloride (prepared according to R. W. Chambers et al., J. Amer. Chem. Soc., 1955, 77, page 1522) in 100 cc. of methylene dichloride, 26.52 g. of N-carbobenzoxy-L-isoleucine dicyclohexylammonium salt (prepared according to Erich Klieger et al., Chem. Ber., 1961, 640, page 157) were added with stirring. The mixture was stirred for 40 minutes at room temperature, then cooled to $-10°$ C., and the precipitate consisting of dicyclohexylammonium hydrochloride was filtered and washed with methylene dichloride. The filtrate and the collected washings were reacted with 12.39 g. of N,N-dicyclohexyl-carbodiimide at about 0° C. and the reaction was allowed to go to completion for 24 hours at about 0° C. and then for 36 hours at room temperature. Some drops of acetic acid were added to destroy the remaining excess of dicyclohexylcarbodiimide and then, after cooling, the dicyclohexylurea formed during the reaction was filtered off and washed with methylene dichloride. The filtrate and the washings were washed sequentially with 1 N hydrochloric acid, with a saturated aqueous sodium chloride solution, with a 5% aqueous sodium bicarbonate solution and then with a saturated aqueous sodium chloride solution to neutrality. The solution was dried over anhydrous sodium sulfate and the solvent was distilled off under reduced pressure. The residue was crystallized from ethanol. 18.2 g. of N-carbobenzoxy-L-isoleucyl-glycine ethyl ester were obtained, melting at 156–159° C. $[\alpha]_D^{21}=-26.8°$ (c.=2 in methanol). $Rf=0.95$.

16.40 g. of this N-carbobenzoxy-L-isoleucyl-glycine ethyl ester was treated for 80 minutes at room temperature with 115 cc. of an anhydrous saturated hydrogen bromide solution in glacial acetic acid. The solvent was evaporated in vacuo and the oily residue was washed several times by decantation with anhydrous diethyl ether in order to remove the benzyl bromide formed during the reaction. By drying in vacuo 14.10 g. of a very hygroscopic, foamy, light brown colored product were obtained which consists of L-isoleucyl-glycine ethyl ester hydrobromide. $Rf=0.5$, $E_{1.9}=0.9$ Leu.

Employing anhydrous hydrogen chloride in glacial acetic acid instead, the hydrochloride was similarly obtained.

14.90 g. of L-isoleucyl-glycine ethyl ester hydrobromide and 21.02 g. of N-carbobenzoxy-L-phenylalanine p. nitrophenyl ester (prepared according to M. Bodanszky et al., J. Amer. Chem. Soc., 1959, 81, page 6072) were dissolved in 60 cc. of dimethylformamide. The solution was cooled to 0° C. and 6.95 cc. of triethylamine were added. The mixture was stirred for 5 hours at about 0° C., allowed to stand for 24 hours at about 0° C. and finally for 36 hours at a room temperature of 25° C. The semi-solid mixture was diluted with 300 cc. of distilled water and stirred for 30 minutes. The precipitate was filtered, washed with water and then with diethyl ether and dried in vacuo. 24.5 g. of N-carbobenzoxy-L-phenylalanyl-L-isoleucyl-glycine ethyl ester were obtained, melting at 175–176° C. $[\alpha]_D^{22}=-34°$ (c.=2 in methanol). $Rf=1$ approximately.

14.52 g. of this N-carbobenzoxy-L-phenylalanyl-L-isoleucyl-glycine ethyl ester were reacted for 90 minutes at room temperature with 74 cc. of an anhydrous saturated hydrogen bromide solution in glacial acetic acid. The solvent was removed under reduced pressure and the oily residue was washed several times by decantation with anhydrous diethyl ether. 13.25 g. of a solid light brown colored product consisting of L-phenylalanyl-L-isoleucyl-glycine ethyl ester hydrobromide were obtained. $Rf=0.90$. $E_{1.9}=0.61$ Leu.

Employing anhydrous hydrochloric acid in glacial acetic acid instead, the hydrochloride was similarly obtained.

To a solution of 19.77 g. of $N^\alpha,N^\epsilon$-di-carbo-t. butoxy-L-lysine (prepared as described in Example 1 of U.S. patent application Serial No. 338,574, now Patent No. 3,272,790) in 220 cc. of ethyl acetate cooled to 0° C., 10 g. of p. nitro-phenol and 12.36 g. of N,N'-dicyclohexylcarbodiimide were added. The mixture was stirred for 30 minutes at 0° C., then for 3 hours at room temperature. The resulting dicyclohexylurea was filtered and washed with ethyl acetate. The filtrate and the collected washings were washed with a 5% aqueous sodium carbonate solution until the yellow color disappeared and then with saturated aqueous sodium chloride solution to neutrality. The solution was dried over anhydrous sodium sulfate and the solvent was removed by evaporation under reduced pressure and the residue was crystallized from diethyl ether. 18.61 g. of $N^\alpha,N^\epsilon$-di-carbo-t. butoxy-L-lysine-p. nitrophenyl ester were obtained, melting at 122–124° C. $Rf=1$.

2.06 g. of L-phenylalanyl-L-isoleucyl-glycine ethyl ester hydrobromide were dissolved in 15 cc. of dimethylformamide and reacted with 0.9 cc. of triethylamine. The triethylamine hydrobromide precipitated was filtered off in the cold and washed with 10 cc. of dimethylformamide. 2.80 g. of $N^\alpha,N^\epsilon$-di-carbo-t. butoxy-L-lysine-p. nitrophenyl ester together with a drop of acetic acid as a catalyst of the reaction were added to the above solution. The solution was allowed to stand for 24 hours at room temperature. A thick precipitate separated, which was pulped in distilled water, filtered in the cold and washed with aqueous dimethylformamide. The product was purified by dissolution in the warm in dimethylformamide, by concentration of the solution under reduced pressure and dilution with ethyl acetate. On cooling, 3.00 g. of $N^\alpha,N^\epsilon$-di-carbo-t. butoxy - L - lysyl - L - phenylalanyl - L - isoleucyl - glycine ethyl ester were obtained, melting at 197–199° C. $[\alpha]_D^{22} = -21.6°$ (c.=2 in dimethylformamide).

2.59 g. of this $N^\alpha,N^\epsilon$-di-carbo-t. butoxy-L-lysyl-L-phenylalanyl-L-isoleucyl-glycine ethyl ester were suspended in a mixture of 25 cc. of ethanol, 5.5 cc. of 0.85 N potassium hydroxide and 8 cc. of water and stirred at room temperature for 90 minutes. To the solution obtained, 75 cc. of water were added. A light gelatinous precipitate separated, which was removed by filtration. The filtrate was acidified at 0° C. with acetic acid and the resulting precipitate was filtered and washed with ice water, dried on the filter by pump suction and then in high vacuo in the presence of phosphoric anhydride and potassium hydroxide. 2.40 g. of pulverulent product, consisting of $N^\alpha,N^\epsilon$-di-carbo-t. butoxy-L-lysyl-L-phenylalanyl-L-isoleucyl-glycine was obtained, melting at 183–185° C.

EXAMPLE 3

*$N^\alpha,N^\epsilon$-di-carbo-t. butoxy-L-lysyl-L-phenylalanyl-L-isoleucyl-glycyl-L-leucyl-L-methioninamide*

To a solution of 1.50 g. of $N^\alpha,N^\epsilon$-di-carbo-t. butoxy-L-lysyl-L-phenylalanyl-L-isoleucyl-glycine in 15 cc. of distilled dimethylformamide and 5 cc. of acetonitrile, cooled to −6° C., 0.673 g. of L-leucyl-L-methionamide hydrochloride, 0.32 cc. of triethylamine and 0.466 g. of N,N'-dicyclohexylcarbodiimide were added under stirring. The reaction mixture was kept for 4 hours at −6° C., then overnight at about 0° C. and finally for 24 hours at room temperature. A solid mass was obtained, which was pulped with distilled water, filtered and washed with aqueous dimethylformamide. The product was dissolved in warm dimethylformamide and the filtered solution was concentrated under reduced pressure. By adding diethyl ether and cooling a gelatinous product separated, which was filtered, washed with diethyl ether and dried in vacuo. Chromatography on a plate revealed a mixture of hexapeptide and of acylurea of the tetrapeptide. From the mother liquors a further crop separated, which consisted essentially of the acylurea. The first crop was purified by dissolution in dimethylformamide and precipitation by adding diethyl ether-ethyl acetate. After three purifications, 0.55 g. of the pure hexapeptide $N^\alpha,N^\epsilon$-di-carbo-t. butoxy-L-lysyl-L-phenylalanyl-L-isoleucyl-glycyl-L-leucyl-L-methioninamide were obtained, melting at 244–245° C. $[\alpha]_D^{23} = -26°$ (c.=1 in dimethylformamide).

EXAMPLE 4

*L-lysyl-L-phenylalanyl-L-isoleucyl-glycyl-L-leucyl-L-methioninamide dihydrochloride dihydrate*

0.390 g. of $N^\alpha,N^\epsilon$-di-carbo-t. butoxy-L-lysyl-L-phenylalanyl-L-isoleucyl-glycyl-L-leucyl-L-methioninamide were reacted for 35 minutes at room temperature with 10 cc. of 1.3 N anhydrous hydrogen chloride in glacial acetic acid. The solution was evaporated under reduced pressure to dryness. The crystalline residue was taken up with anhydrous diethyl ether, filtered and washed several times with anhydrous diethyl ether, and dried in vacuo in the presence of potassium hydroxide. 0.330 g. hexapeptide hydrochloride were obtained, melting at 240–243° C. $[\alpha]_D^{22} = -20°$ (c.=1 in 95% acetic acid). $Rf=1$, $E_{1.9}=0.75$ Leu.

By employing anhydrous hydrogen bromide in glacial acetic acid or trifluoroacetic acid it was equally possible to split off the protecting group carbo-t. butoxy and to obtain the free hexapeptide in the form of a salt of the corresponding acid employed in the acidolysis. If the hexapeptide L-lysyl-L-phenylalanyl-L-isoleucyl-glycyl-L-leucyl-L-methioninamide has the two amino groups of the lysyl radical blocked by other protecting groups, these may be removed by other splitting-off agents known in the polypeptides chemistry, such as hydrogen in the presence of palladium or metallic sodium in liquid ammonia.

We claim:
1. The protected hexapeptide having the structure L-lysyl-L-phenylalanyl-L - isoleucyl - glycyl - L - leucyl - L-methioninamide wherein the two amino groups of lysine are blocked by a protecting group selected from the group consisting of trityl, tosyl, phthalyl, carbobenzyloxy, carbo-t. butoxy, trifluoroacetyl, and formyl.
2. $N^\alpha,N^\epsilon$-di-carbo-t. butoxy-L-lysyl-L-phenylalanyl - L-isoleucyl-glycyl-L-leucyl-L-methioninamide.
3. L-lysyl-L-phenylalanyl-L-isoleucyl-glycyl-L - leucyl-L-methioninamide and its non-toxic pharmaceutically acceptable acid addition salts.
4. L-lysyl-L-phenylalanyl-L-isoleucyl-glycyl-L - leucyl-L-methioninamide-bis-hydrochloride-di-hydrate.
5. L-leucyl-L-methioninamide.
6. $N^\alpha,N^\epsilon$-di-carbo-t. butoxy-L-lysyl-L-phenylalanyl-L-isoleucyl-glycine.

References Cited by the Examiner

UNITED STATES PATENTS 2,900,375  8/1959  Amiard et al. _____ 260—112.5

OTHER REFERENCES

Schröder and Lübke, "The Peptides," volume II, published by Academic Press (1966), pp. 127–153.

LEWIS GOTTS, *Primary Examiner.*

ELBERT L. ROBERTS, *Examiner.*

PERRY A. STITH, M. M. KASSENOFF,
*Assistant Examiners.*